May 3, 1960 M. WELLS 2,935,551
CONNECTOR FOR STRANDED ELECTRICAL CABLES
Filed Oct. 19, 1956
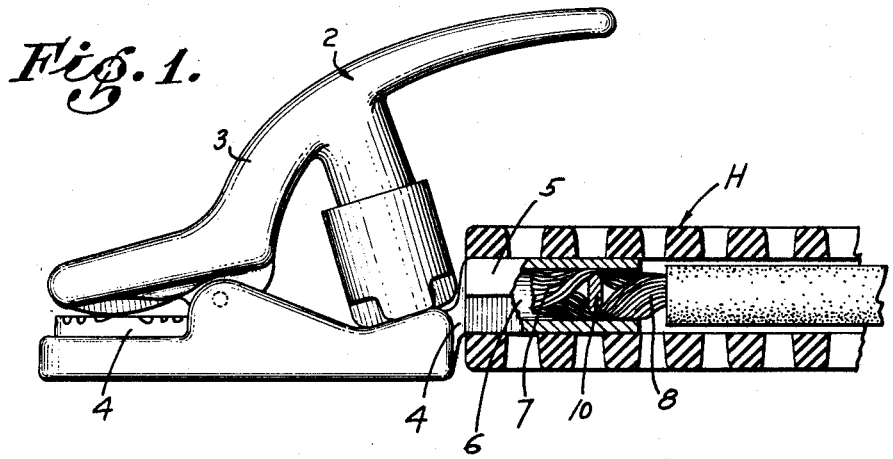
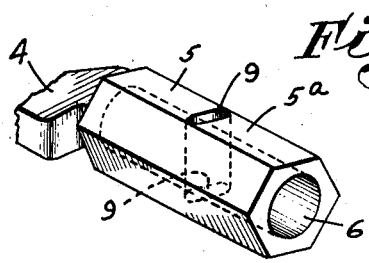
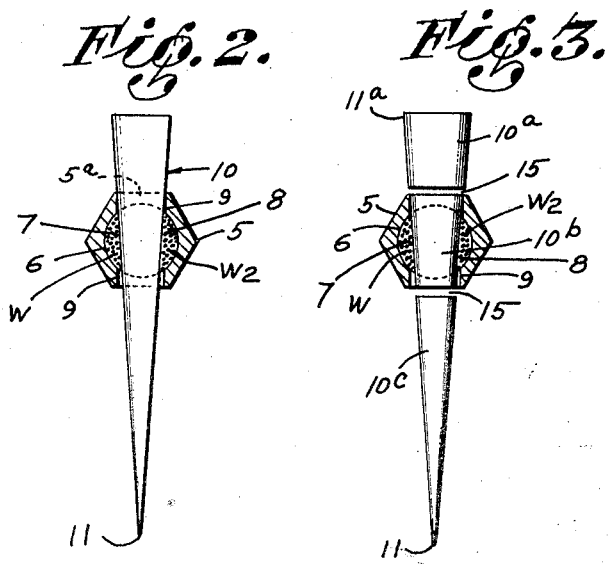
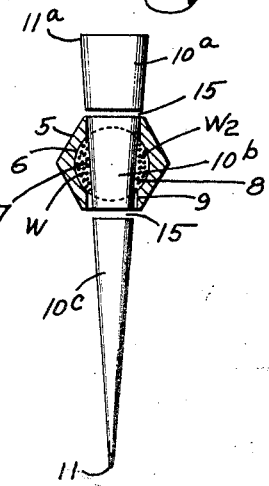
INVENTOR.
MARTIN WELLS
BY
ATTORNEY United States Patent Office 2,935,551
Patented May 3, 1960

2,935,551
CONNECTOR FOR STRANDED ELECTRICAL CABLES

Martin Wells, Pasadena, Calif.

Application October 19, 1956, Serial No. 617,082

3 Claims. (Cl. 174—90)

My invention relates to means for connecting stranded electrical cables to electrical devices and relates in particular to a cable connecting means especially suitable for the connection of an electrical cable to a welding rod holder of electrical welding equipment.

It is an object of the invention to provide a connector for a stranded electrical cable which does not require use of solder or lead which must be melted in order to make it usable in connecting the cable to an electrical part, yet will make a superior type of electrical connection which will remain firm indefinitely, but which may be readily disconnected should it be desired to connect the cable to another electrical part. For example, if the invention is used for the connection of a welding rod holder to the cable, the holder which requires replacement may be quickly removed from the cable and the replacement holder then connected to the cable without use of special equipment or metal heating pots.

It is also an object of the invention to provide an efficient cable connector having a wedge receiving member against which the end portion of the cable is clamped, and a wedge member having a length which is a multiple of the length of the wedge receiving member, it being intended that the wedge member shall be driven in to a desired cable-clamping position in the wedge receiving member, and that the end portion or end portions of the wedge member be cut off, leaving an effective wedge part securely fixed in the wedge receiving part of the wedge receiving member, this wedge part being removable when disconnection of the cable is desired.

Further objects and advantages of the invention may be brought out in the following part of the specification wherein some details have been described for the purpose of competence of disclosure, without intending to limit the scope of the invention which is set forth in the appended claims.

Referring to the drawings which are for illustrative purposes only:

Fig. 1 is a partly sectioned elevational view of the invention as a means for connecting an electric cable to a welding rod holder.

Fig. 2 is an enlarged cross section showing one of the steps followed in connecting the cable.

Fig. 3 is a sectional view similar to Fig. 2, showing the completion of the operation of connecting the cable.

Fig. 4 is a perspective view of the socket part of the cable connector.

Fig. 5 is a perspective view of the wedge member of the cable connector.

Referring to Fig. 1, I show a welding rod holder 2 having a clamping lever 3 which is connected to a metal body or lever 4 having at its rear end a metal socket 5 provided with an opening 6 leading in from the rear end and being adapted to receive the end 7 of a stranded cable 8. The socket 5 of the cable connector is shown in perspective in Fig. 4. Its opening 6 is cylindrical but its exterior may be polygonal so that the insulated handle H, Fig. 1, which is employed thereon will not rotate on the socket 5 and relative to the welding rod holder 2. In the metal wall 5a of the socket 5 there is a transverse opening 9 which intersects the opening or bore 6 of the socket 5. The transverse opening is laterally elongated instead of being round in cross-section, so as to correspond to the flattened cross-section of the wedge of spear 10 which is shown in perspective in Fig. 5. The wedge 10 is made of copper or an alloy thereof and has a shape as shown in Fig. 5. It has a sharp point 11 at one end and its other end 11a is approximately the same size as the front end of the opening 9. The wedge 10 tapers from its rear end 11a to its point 11 and has a length which is a multiple of the diameter of the socket 5. Therefore, the wedge 10 is slender, for the purpose which will be explained in the following.

The cable-connecting operation is as follows: The cable end 7 is inserted in the opening 6 so that its extremity lies close to the bottom wall of the opening 6 and so that the bundle of wires forming the cable end 7 passes across the opening 9. The wedge 10 is then driven through the opening 9 and centrally through the bundle of wires of the cable end 7. The cable wires, as indicated at W and W2, are spread apart as the point and then succeeding parts of the wedge 10 move inwardly through the opening 9 and through the cable end 7, and the wires W and W2 are forced outwardly so as to be tightly against the walls of the socket 5 lying on opposite portions of the wedge 10 extending through the socket 5.

The completion of the operation consists of severing the upper and lower projection ends 10a and 10c, as shown in Fig. 3, from the intermediate portion 10b of the wedge 10. Cuts 15 may be made through the wedge 10 adjacent the upper ends of the opening 9 of the socket 5, for example by use of a hack saw. The cable end 7 will be firmly secured in the socket 5 until its removal is desired, which may be accomplished by driving out the wedge portion 10b.

I claim as my invention:

1. In a cable connection of the character described: a tubular part having an internal wall of electro-conductive metal defining a longitudinal opening leading in from an end thereof receiving an end of a stranded electrical cable and transverse openings in said wall at opposite sides of said longitudinal opening, said transverse openings defining a passage intersecting the longitudinal axis of said longitudinal opening; and a wedge having its sides gradually tapered from a wide portion to a sharp point, said wedge extending through said transverse openings to divide the strands of said cable end and to force said strands laterally against opposite sides of said internal wall of said tubular part to establish an effective electrical contact therewith, said wedge being of a length which is greater than the distance between the outer ends of said transverse openings and being adapted to be cut at the outer ends of said transverse openings after it has been installed in said tubular part.

2. A cable connection as recited in claim 1 wherein the length of said wedge is several times greater than the distance between the outer ends of said transverse openings.

3. A cable connection as recited in claim 1 wherein said transverse openings are elongated in a direction transverse to said longitudinal opening and said wedge has a cross-section corresponding to said transverse openings.

References Cited in the file of this patent
UNITED STATES PATENTS

| 177,318 | Barbour | May 16, 1876 |
| 2,259,261 | Miller et al. | Oct. 14, 1941 |
| 2,278,986 | Gibbs | Apr. 7, 1942 |

FOREIGN PATENTS

| 534,051 | France | Dec. 26, 1921 |